United States Patent
Lipp et al.

(10) Patent No.: US 12,060,930 B1
(45) Date of Patent: Aug. 13, 2024

(54) SEALING SYSTEM FOR MULTIPLE FLUIDS

(71) Applicant: DEERE & COMPANY, Moline, IL (US)

(72) Inventors: Daniel P. Lipp, Fargo, ND (US); Kevin R. King, Bettendorf, IA (US); Clayton P. Neumann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/307,176

(22) Filed: Apr. 26, 2023

(51) Int. Cl.
| | |
|---|---|
| *F16H 57/02* | (2012.01) |
| *B60Q 5/00* | (2006.01) |
| *B60Q 9/00* | (2006.01) |
| *F16H 57/029* | (2012.01) |
| *F16H 57/04* | (2010.01) |

(52) U.S. Cl.
CPC ......... *F16H 57/029* (2013.01); *F16H 57/045* (2013.01); *B60Q 5/005* (2013.01); *B60Q 9/00* (2013.01); *F16H 2057/02026* (2013.01); *F16H 2057/02034* (2013.01)

(58) Field of Classification Search
CPC .............. F16H 57/029; F16H 57/045; F16H 2057/02026; F16H 2057/02034; B60Q 5/005; B60Q 9/00
See application file for complete search history.

(56) References Cited

U.S. PATENT DOCUMENTS

| | | |
|---|---|---|
| 3,708,245 A | 1/1973 | King |
| 5,044,430 A | 9/1991 | Avrea |
| 5,066,200 A | 11/1991 | Ooka |
| 5,090,871 A | 2/1992 | Story et al. |
| 5,562,406 A | 10/1996 | Ooka et al. |
| 5,703,569 A | 12/1997 | Oliver et al. |
| 6,331,349 B1 | 12/2001 | Kalinoski et al. |

(Continued)

FOREIGN PATENT DOCUMENTS

| | | |
|---|---|---|
| DE | 202012011555 U1 | 12/2013 |
| EP | 2252138 A1 | 11/2010 |
| JP | 2011217547 A | 10/2011 |

OTHER PUBLICATIONS

CSS-5124 Gask-O-Seal Design Handbook, 2020, 24 pages, retrieved from <URL: https://www.parker.com/content/dam/Parker-com/Literature/Seal-Group/CSS-5124.pdf>.

(Continued)

*Primary Examiner* — Adam D Rogers

(57) ABSTRACT

A sealing system for multiple fluids includes a transmission housing having a first port and a first opening, an electronic component connected to the transmission housing forming a vent space between the electronic component and the transmission housing, and a seal positioned between the electronic component and the transmission housing. The electronic component includes a first conduit. The seal includes an outer loop maintaining a first fluid outside of the outer loop. The seal includes a first inner loop surrounding the first conduit and positioned inside of the outer loop. The first inner loop maintains a second fluid inside the first inner loop. The first port is in fluid communication with the first conduit. The first opening is positioned inside of the outer loop and outside of the first inner loop. The first opening is in fluid communication with the vent space.

20 Claims, 9 Drawing Sheets

(56) References Cited

U.S. PATENT DOCUMENTS

| | | |
|---|---|---|
| 6,370,454 B1 | 4/2002 | Moore |
| 6,387,303 B1 | 5/2002 | Jones et al. |
| 6,521,164 B1 | 2/2003 | Plummer et al. |
| 7,152,571 B1 | 12/2006 | Wilson et al. |
| 8,162,626 B2 | 4/2012 | Fukasaku et al. |
| 8,867,210 B2 | 10/2014 | Harmelink et al. |
| 9,030,063 B2 | 5/2015 | Rawlinson et al. |
| 9,167,876 B2 | 10/2015 | Yamaguchi et al. |
| 9,315,212 B1 | 4/2016 | Kyrtsos et al. |
| 9,901,004 B2 | 2/2018 | Kang et al. |
| 9,986,806 B1 | 6/2018 | Khodapanah |
| 10,259,339 B1 | 4/2019 | Miura et al. |
| 10,859,163 B2 | 12/2020 | Reinhart et al. |
| 11,035,455 B2 * | 6/2021 | Nikprelevic ....... F01M 11/0004 |
| 11,137,052 B2 | 10/2021 | Ore et al. |
| 11,303,183 B2 | 4/2022 | Downs et al. |
| 11,320,058 B2 | 5/2022 | Kidder et al. |
| 11,420,512 B2 | 8/2022 | Worley et al. |
| 11,439,028 B2 | 9/2022 | Atsumi et al. |
| 11,938,806 B2 | 3/2024 | Finger-Albert et al. |
| 2004/0007821 A1 | 1/2004 | Ramsay |
| 2004/0055375 A1 | 3/2004 | Zurek et al. |
| 2005/0083652 A1 | 4/2005 | Jairazbhoy et al. |
| 2007/0193285 A1 | 8/2007 | Knight et al. |
| 2011/0172890 A1 | 7/2011 | Ulrey et al. |
| 2012/0255366 A1 | 10/2012 | Cai et al. |
| 2013/0098315 A1 | 4/2013 | Beyer |
| 2014/0175867 A1 | 6/2014 | Sung et al. |
| 2014/0190665 A1 | 7/2014 | Joshi et al. |
| 2014/0202279 A1 * | 7/2014 | Triantos ................. F16H 57/02 74/606 R |
| 2014/0237998 A1 | 8/2014 | Fahrenkrug et al. |
| 2014/0347817 A1 | 11/2014 | Joshi et al. |
| 2014/0360772 A1 | 12/2014 | Coppola et al. |
| 2015/0285369 A1 * | 10/2015 | Benson ................. F16K 31/002 251/11 |
| 2015/0348869 A1 | 12/2015 | Joshi et al. |
| 2016/0021784 A1 | 1/2016 | Choi et al. |
| 2016/0069452 A1 * | 3/2016 | Martin ................. F16K 31/0655 137/571 |
| 2016/0183409 A1 | 6/2016 | Zhou et al. |
| 2016/0379852 A1 | 12/2016 | Tustaniwskyj |
| 2017/0023000 A1 | 1/2017 | Weule |
| 2017/0055378 A1 | 2/2017 | Zhou et al. |
| 2017/0094837 A1 | 3/2017 | Joshi et al. |
| 2018/0014418 A1 | 1/2018 | Kang et al. |
| 2018/0130589 A1 | 5/2018 | Yonak et al. |
| 2018/0262089 A1 | 9/2018 | Hatch |
| 2018/0331601 A1 | 11/2018 | Zhou et al. |
| 2019/0189329 A1 | 6/2019 | Roan et al. |
| 2019/0223324 A1 | 7/2019 | Le et al. |
| 2023/0349459 A1 * | 11/2023 | Hidaka ................. F16H 57/031 |

OTHER PUBLICATIONS

CSS-5151 Integral Seal for Hydraulic Transmission Assembly, 2021, 1 page, retrieved from <URL: https://www.parker.com/content/dam/Parker-com/Literature/Seal- Group/CSS-5151-Hydraulic-Transmission.pdf>.

Parker Extruded EMI Gaskets for Electronics Shielding, 2014, 83 pages, retrieved from <URL: https://www.parker.com/literature/Chomerics/Parker%20Chomerics%20Extruded%20EMI%20Gaskets%20Products%20and%20Custom%20Solutions%20Catalog.pdf>.

Edge-Bonded Gasket Sealing Technology, 2024, 5 pages, retrieved from <URL: https://www.parker.com/us/en/divisions/composite-sealing-systems-division/solutions/edge-bonded-gasket-sealing-technology.html>.

Ultrasonic Sensing Basics, 2021, 15 pages, retrieved from <URL: https://www.ti.com/lit/an/slaa907d/slaa907d.pdf?ts=1715572665821&ref_url=https%253A%252F%252Fcn.bing.com%252F>.

German Search Report issued in application No. 102023134032.8 dated Jun. 21, 2024, 10 pages.

* cited by examiner

US 12,060,930 B1

SEALING SYSTEM FOR MULTIPLE FLUIDS

FIELD OF THE DISCLOSURE

The present disclosure relates to a sealing system for multiple fluids.

BACKGROUND

Seals are used in a variety of applications to create a barrier for fluids, either to maintain fluids within a boundary or prevent a fluid from entering a boundary.

SUMMARY

According to an aspect of the present disclosure, a sealing system for multiple fluids includes a transmission housing forming an enclosure for one or more transmission components, an electronic component including a first conduit, and a seal positioned between the electronic component and the transmission housing. The transmission housing includes a first port and a first opening. The electronic component is connected to the transmission housing forming a vent space between the electronic component and the transmission housing. The seal includes an outer loop maintaining a first fluid outside of the outer loop and a first inner loop surrounding the first conduit and positioned inside of the outer loop. The first inner loop maintains a second fluid inside the first inner loop. The first port is in fluid communication with the first conduit. The first opening is positioned inside of the outer loop and outside of the first inner loop. The first opening is in fluid communication with the vent space.

According to an aspect of the present disclosure, the seal includes a protrusion extending downward along a lower portion of the outer loop under the first conduit.

According to an aspect of the present disclosure, the seal includes a first link connected between the outer loop and the first inner loop maintaining a distance between the outer loop and the first inner loop.

According to an aspect of the present disclosure, the first opening is positioned within a recess near a lower portion of the vent space.

According to an aspect of the present disclosure, the transmission housing includes a first coupling surface with a first recess near a lower portion of the vent space, the electronic component includes a second coupling surface with a second recess near a lower portion of the vent space, the first recess includes in the first opening, the first recess aligns with the second recess, and the first and second recesses form a portion of the vent space.

According to an aspect of the present disclosure, the seal includes an additional loop for an electrical wiring connected to an electric motor-generator positioned inside the transmission housing.

According to an aspect of the present disclosure, the electronic component includes a second conduit in fluid communication with the first conduit forming an inlet and an outlet for the second fluid to regulate the temperature of the electronic component, the seal includes a second inner loop surrounding the second conduit and positioned inside of the outer loop, the second inner loop maintains the second fluid inside the second inner loop, the transmission housing includes a second port and a second opening, the second port is in fluid communication with the second conduit, the second opening is positioned inside of the outer loop and outside of the first inner loop, and the second opening is in fluid communication with the vent space.

According to an aspect of the present disclosure, the electronic component is positioned at least partially in a fluid sump of the transmission.

According to an aspect of the present disclosure, the electronic component is a power electronics device.

According to an aspect of the present disclosure, the sealing system includes a sensor to detect a fluid flowing through or out of the first opening and a controller to determine providing a visual or audio notification when the fluid is detected flowing through or out of the first opening.

According to an aspect of the present disclosure, a transmission includes the sealing system.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
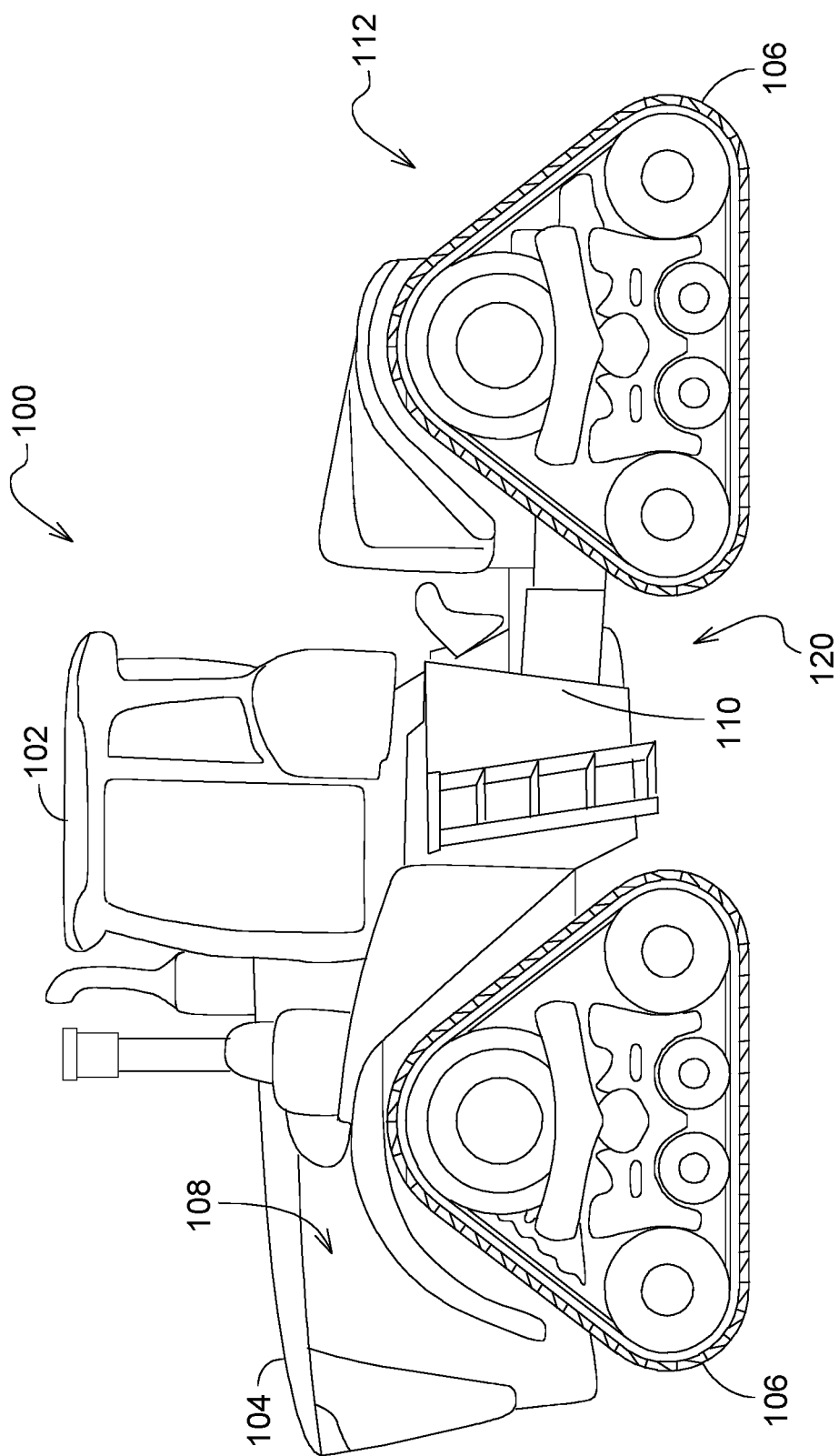
FIG. 1 is a perspective view of a work vehicle including a transmission, according to an implementation.

With reference to FIG. 1, a work vehicle 100, for example an agricultural tractor, can include an operator station or cab 102, a hood 104, one or more ground engaging apparatus 106, for example wheels or track assemblies, and a frame or chassis 110. The work vehicle 100 can include an operator interface having any number and combination of electronic devices, such as an interactive display. The work vehicle 100 can have a rigid or an articulated frame 110. The work vehicle 100 can include one or more power sources 108, for example an internal combustion engine, a hybrid engine, or an electric or hydraulic machine. The work vehicle 100 can include a transmission 120 transferring power from the one or more power sources 108 to a drivetrain, which includes the ground engaging apparatus 106 and one or more power take off (PTO) shafts 112 or other auxiliary power outputs or inputs. This disclosure also applies to other types of work vehicles in agriculture, construction, forestry, and road building.

Figure 2:
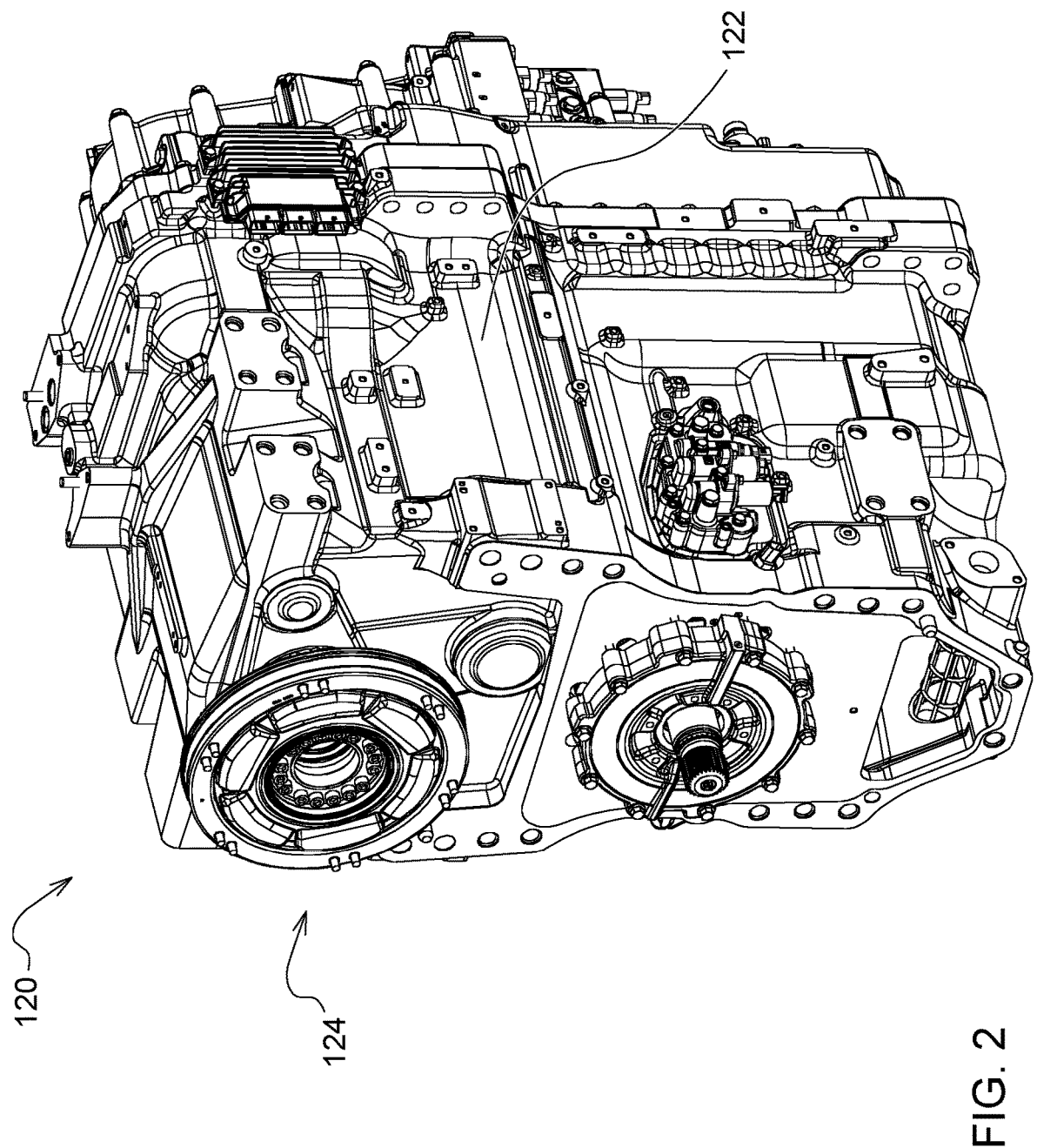
FIG. 2 is a perspective view of a transmission, according to an implementation.

With reference to FIG. 2, the transmission 120 can include a transmission housing 122, which provides an enclosure for the various transmission or other drivetrain components. The transmission 120 can include a plurality of shafts, gears, and clutches inside the transmission housing 122. One or more of the shafts or other transmission or drivetrain components may be rotatably connected to or supported by the transmission housing 122. The transmission 120 can include one or more hydraulic machines, for example pumps or motors, or electric machines 124, for example electric motor-generators. The transmission 120 can include a fluid, such as a hydraulic or transmission fluid. The transmission housing 122 forms an exterior surface of the transmission 120.

Figure 5:
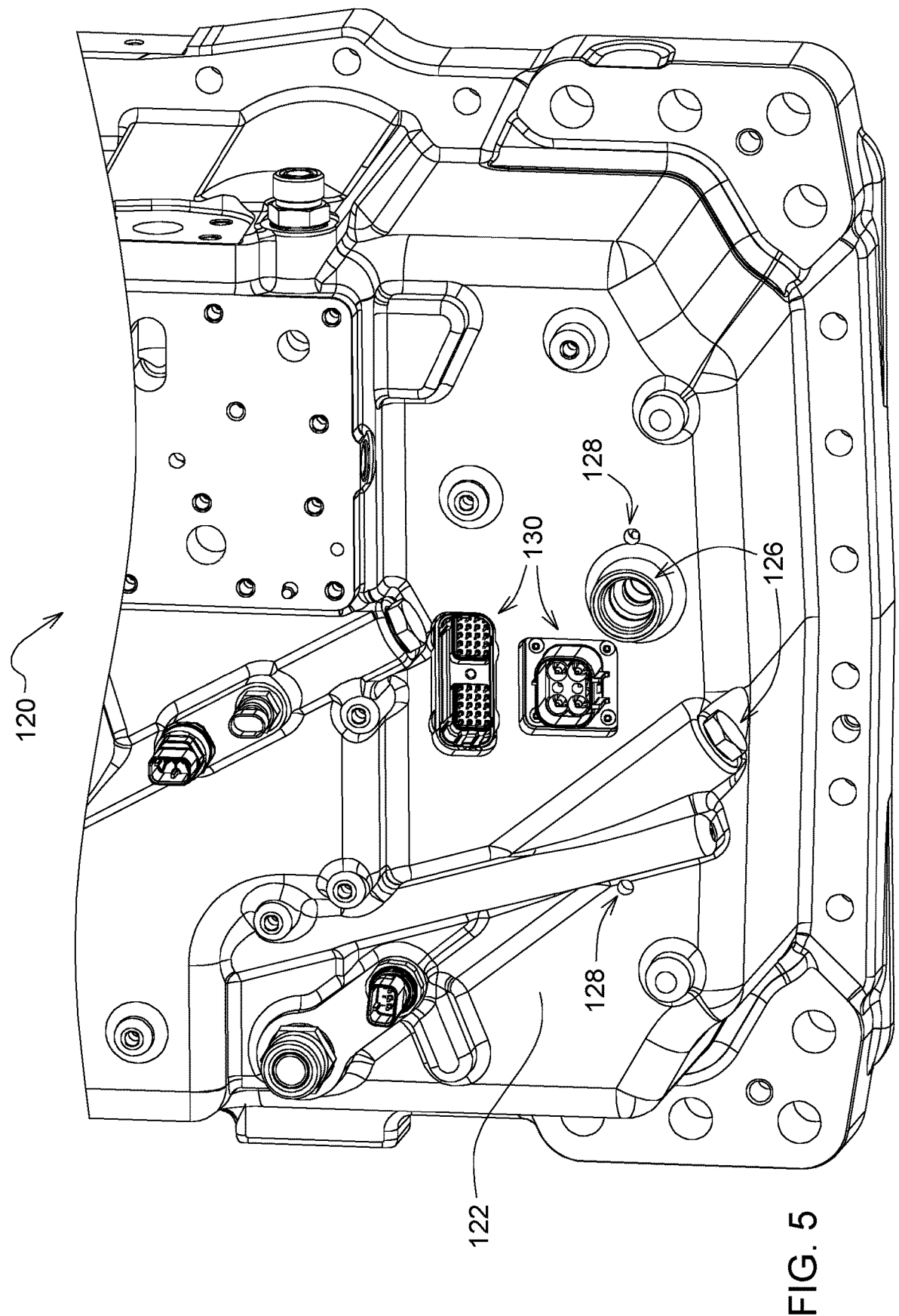
FIG. 5 is a perspective exterior view of a transmission housing, according to an implementation.
Figure 6:
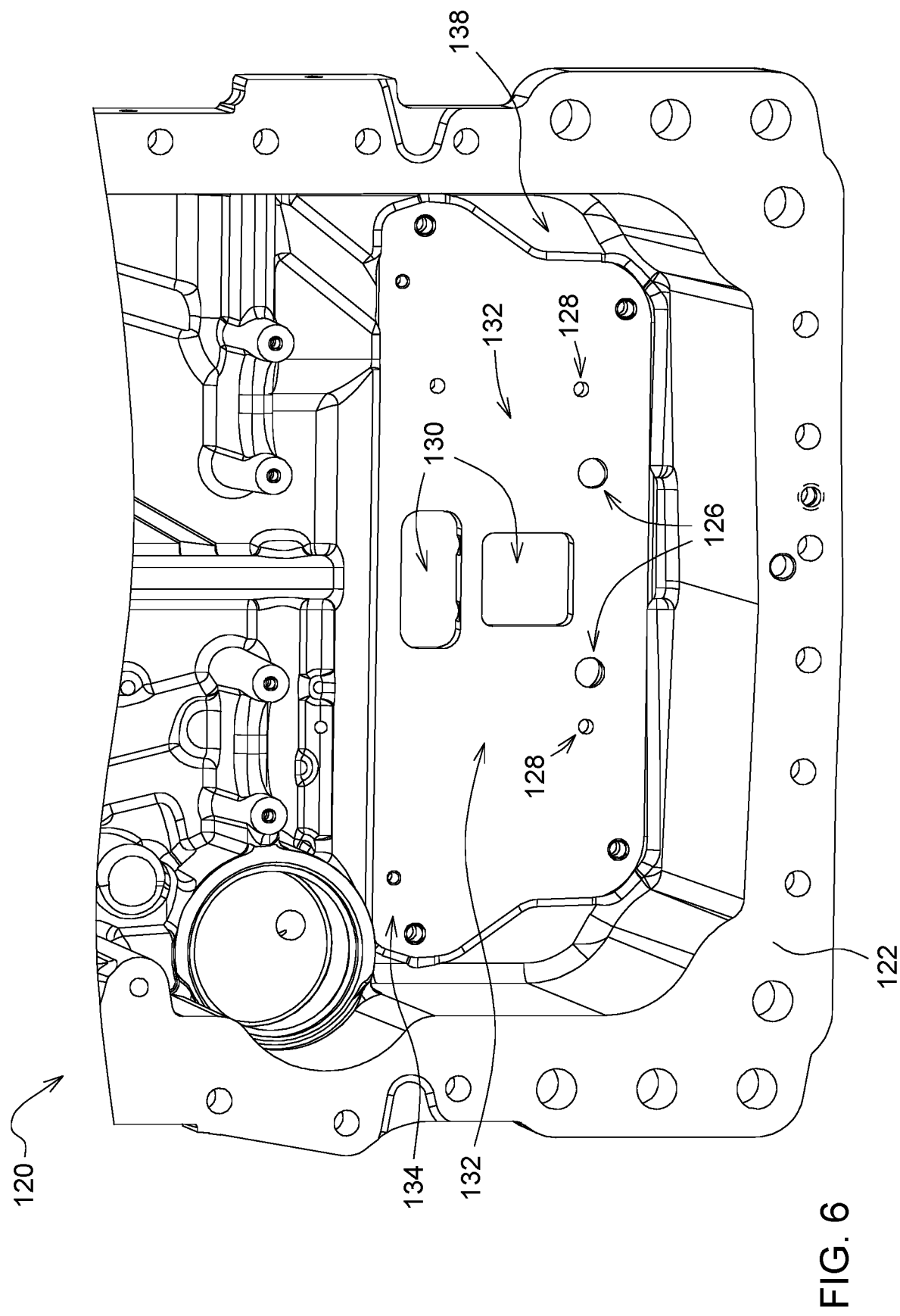
FIG. 6 is a perspective interior view of a transmission housing, according to an implementation.

With reference to FIGS. 5 and 6, the transmission housing 122 includes one or more coolant ports 126, one or more vent openings 128, and one or more electrical openings 130. The transmission housing 122 includes a coupling surface 134. The one or more coolant ports 126, one or more vent openings 128, and one or more electrical openings 130 can be positioned within or inside the boundary of the coupling surface 134. The one or more coolant ports 126 can be positioned at or near a lower portion of the coupling surface 134. The one or more vent openings 128 can be positioned at or near a lower portion of the coupling surface 134. Each vent opening 128 can be positioned at or near a recess 168 at or near a lower portion of the coupling surface 134.

Figure 3:
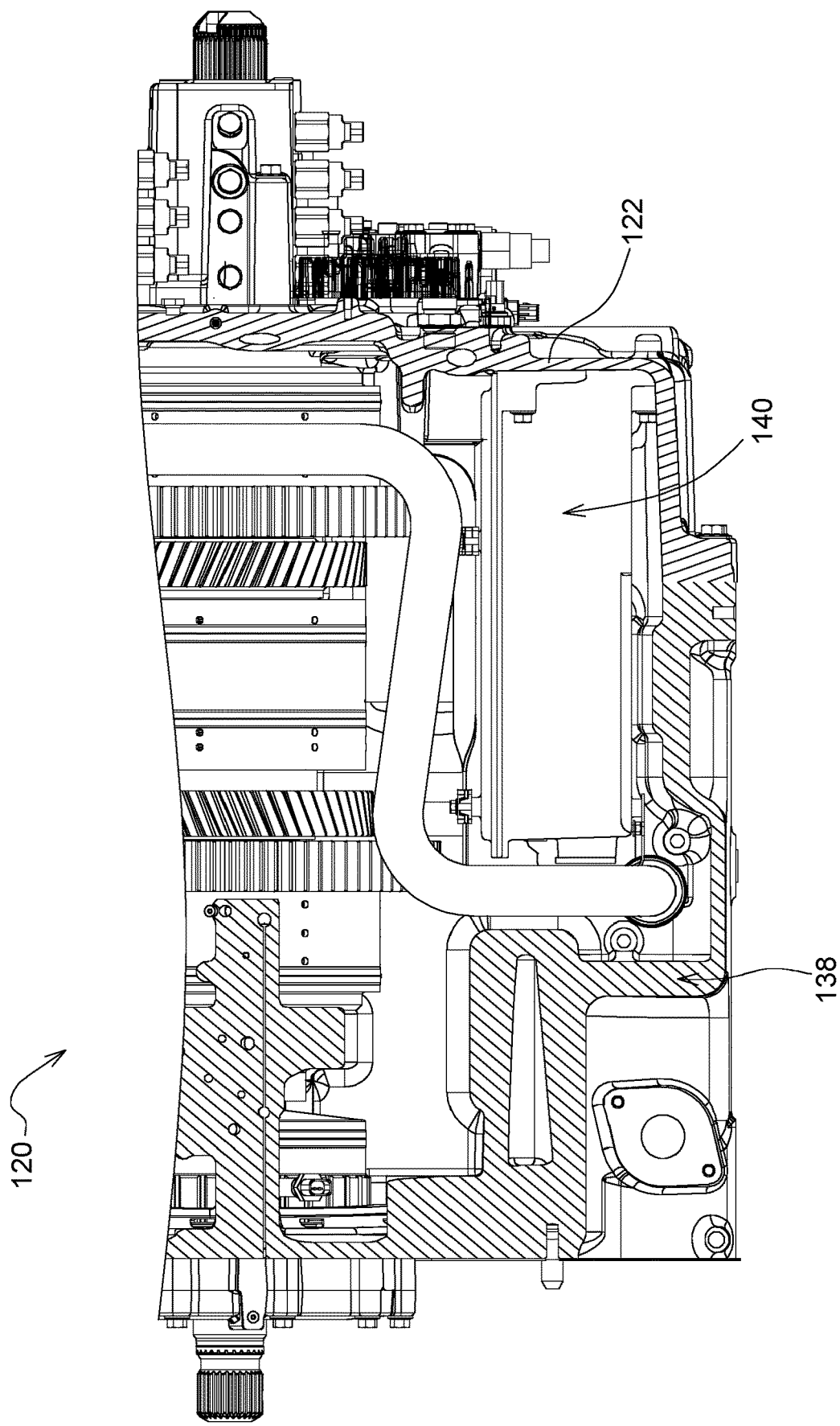
FIG. 3 is a partial cutaway view of a transmission, according to an implementation.
Figure 4:
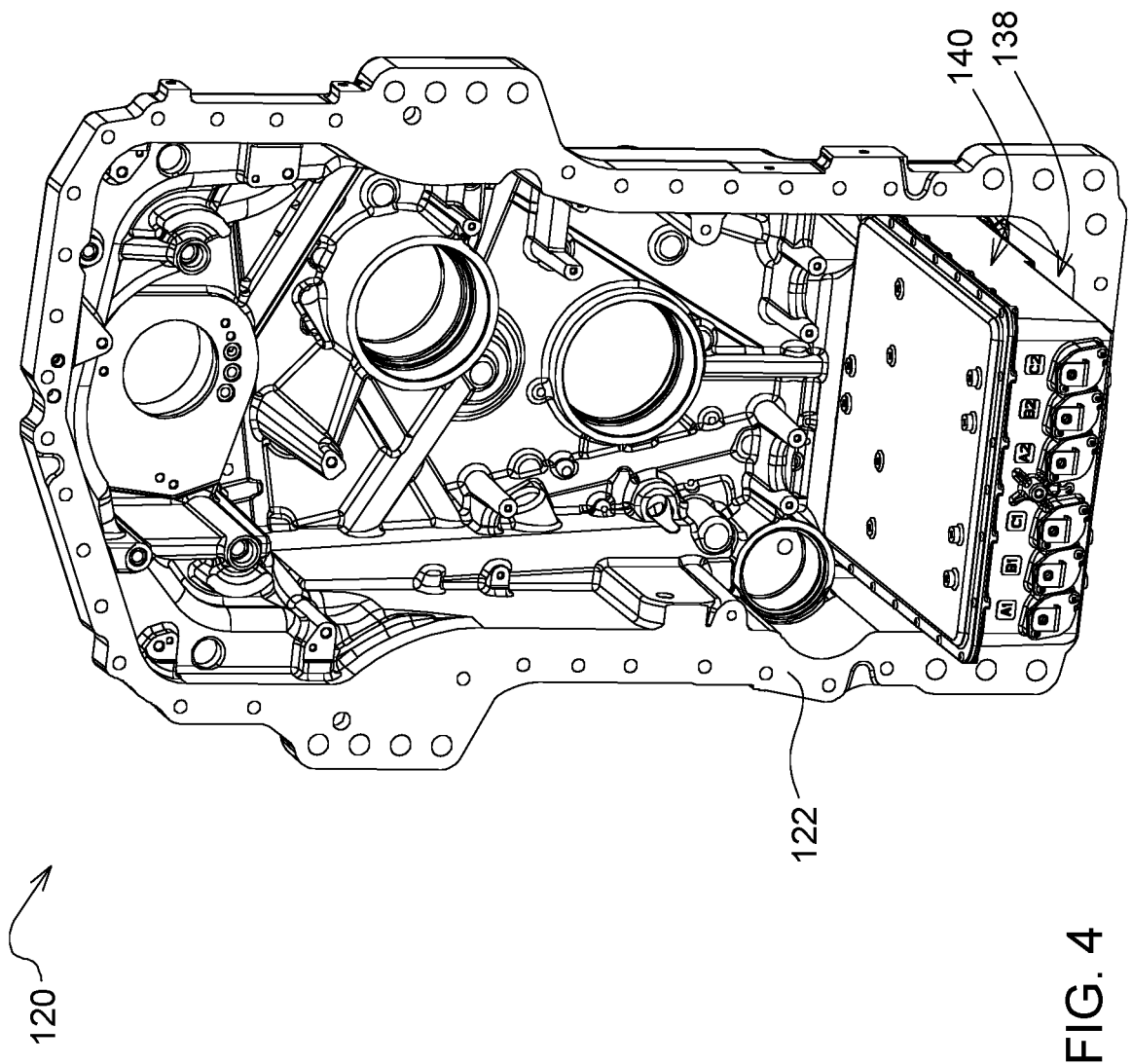
FIG. 4 is a perspective interior view of a transmission housing, according to an implementation.
Figure 7:
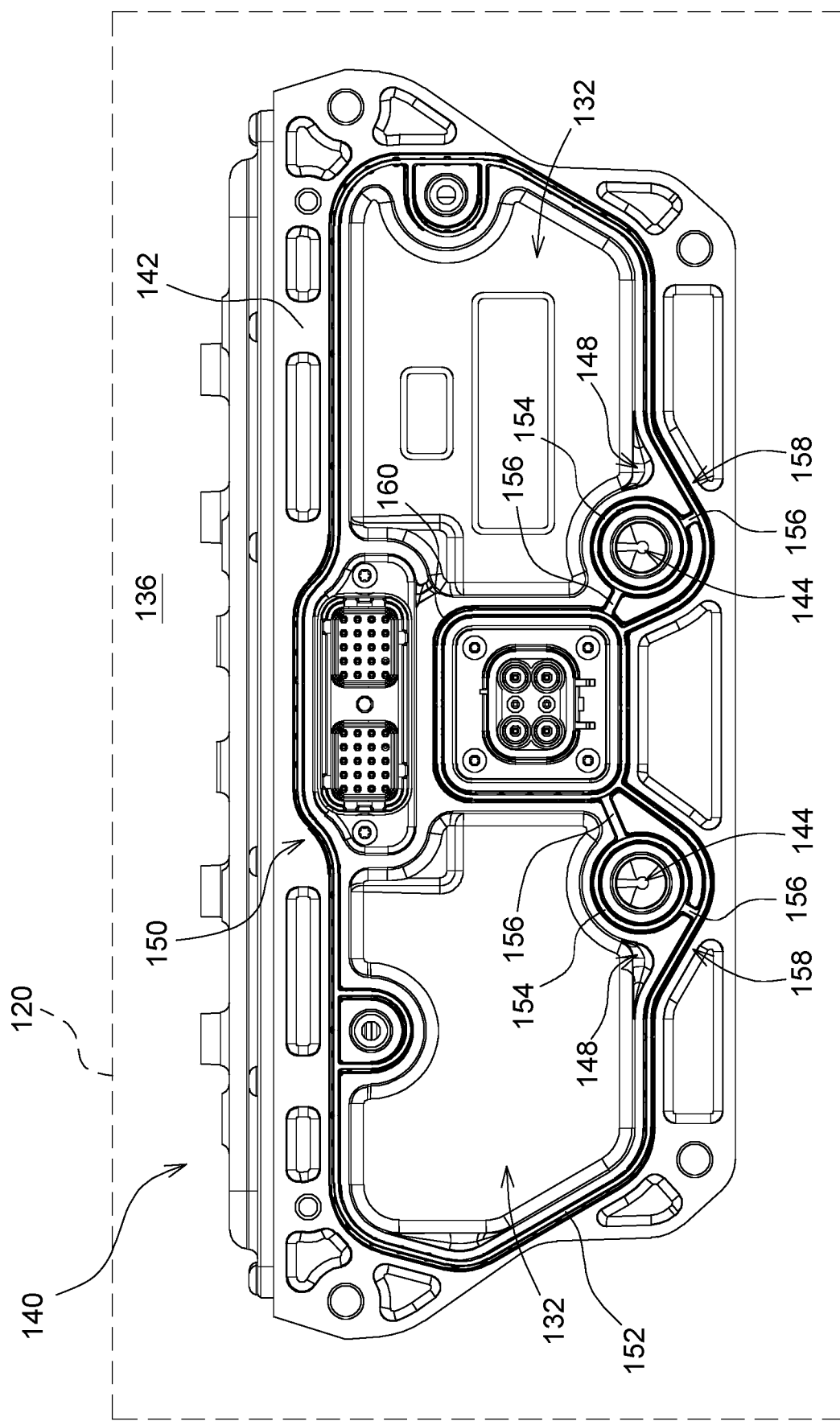
FIG. 7 is a perspective view of an electronic component, according to an implementation.

With reference to FIGS. 3, 4, and 7, an electronic component 140, for example an inverter, a converter, or other power electronics devices, is located or positioned within the transmission 120. The electronic component 140 can be positioned partially or wholly in a reservoir or sump 138 of the transmission 120. The reservoir 138 includes hydraulic or transmission fluid 136.

The electronic component 140 is connected or attached to the transmission housing 122. The coupling surface of 142 of the electronic component 140 connects or couples with the coupling surface 134 of transmission housing 122. A vent space or cavity 132 is formed within the boundary of the coupling surfaces 134, 142. The electronic component 140 includes a coolant conduit 144 with an inlet and an outlet. The coolant conduit 144 of the electronic component 140 corresponds or aligns with the coolant ports 126 of the transmission housing 122 providing a conduit for coolant fluid 146 to regulate the temperature of the electronic component 140. The coolant fluid 146 flows to and from the electronic component 140.

Figure 8:
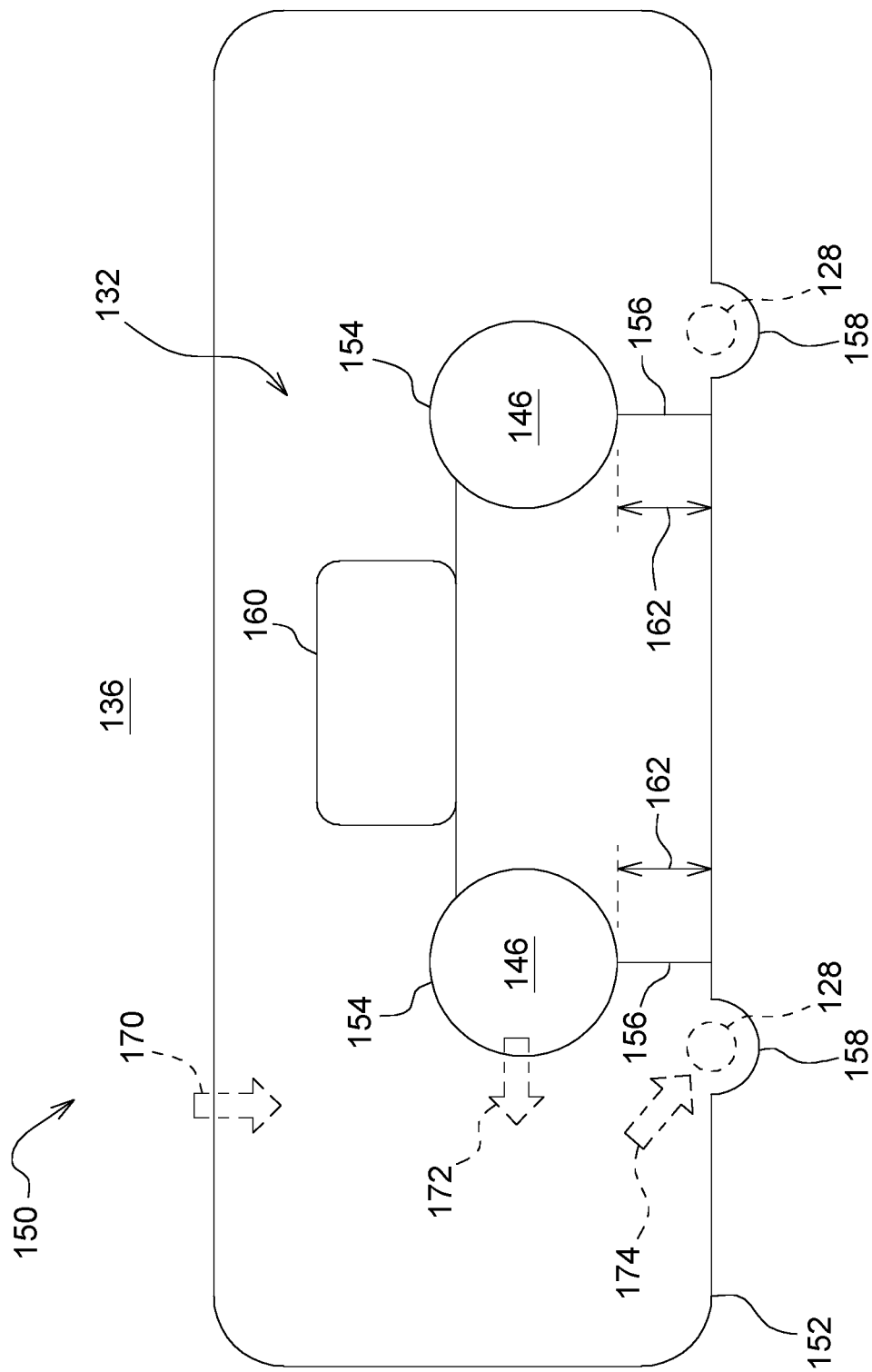
FIG. 8 is a schematic view of a seal, according to an implementation.

With reference to FIGS. 7 and 8, a seal 150 includes a continuous outer loop 152 forming an external barrier. The outer loop 152 maintains a first fluid 136 outside the outer loop 152. The seal 150 includes one or more continuous inner loops 154 positioned inside of the outer loop 152. Each of the one or more inner loops 154 form an internal barrier. Each of the one or more inner loops 154 maintains a second fluid 146, for example coolant fluid, inside the one or more inner loops 154.

For example, the seal 150 includes a first inner loop 154 inside of the outer loop 152. The first inner loop 154 forms an internal barrier, which maintains the second fluid 146, for example coolant fluid, inside the first inner loop 154. The seal 150 can include a second inner loop 154 positioned inside of the outer loop 152. The second inner loop 154 forms an internal barrier, which maintains the second fluid 146, for example coolant fluid, inside the second inner loop 154. The seal 150 can include one or more additional loops 160 for electrical or electronic wiring or connectors or for other fluid passageways.

The seal 150 includes a link 156 connected between the outer loop 152 and the first inner loop 154. The link 156 maintains a distance 162 between the outer loop 152 and the first inner loop 154. The seal 150 can include one or more links 156 between the outer loop 152 and the first inner loop 154. The seal 150 can include one or more links 156 between the outer loop 152 and the second inner loop 154. Alternatively, or additionally, one or more links 156 can connect between the first and second inner loops 154, 154.

The seal 150 can include one or more protrusions 158 extending downward along a lower portion of the outer loop 152. The one or more protrusions 158 can be positioned at or near the bottom of the seal 150. A first protrusion 158 can follow the shape or contour of the first inner loop 154. A second protrusion 158 can follow the shape or contour of the second inner loop 154. The seal 150 can maintain a third fluid inside the outer loop 152 and outside of the one or more inner loops 154. The seal 150 can maintain a third fluid in the vent space or cavity 132 between the outer loop 152 and the first inner loop 154.

The coupling surface 142 of the electronic component 140 can include a recess 148 at or near a lower portion of the coupling surface 142. The coupling surface 142 can include a recess 148 at or near each coolant conduit 144. The one or more recesses 148 in the coupling surface 142 of the electronic component 140 can correspond or align to the one or more recesses 168 in the coupling surface of the transmission housing 122. The one or more recesses 148 and the one or more recesses 168 can form a portion of the vent space 132. Each recess 148 and each recess 168 can correspond to the protrusion 158 of the seal 150. When the electronic component 140 is installed in the transmission 120, the vent space 132 is in fluid communication with the one or more recesses 148, the one or more recesses 168, and the one or more openings 128.

The seal 150 is positioned between the electronic component 140 and the transmission housing 122. The seal 150 is positioned between the coupling surface 134 of the transmission housing 122 and the coupling surface 142 of the electronic component 140. The seal 150 can maintain the separation of fluids, for example a hydraulic or transmission fluid 136, a coolant fluid 146, and atmospheric air or gas. The seal 150 can maintain the hydraulic or transmission fluid 136 outside the outer loop 152. The seal 150 can maintain the coolant fluid 146 inside the inner loop 154. The seal 150 can maintain atmospheric air or a gas in the vent space 132 positioned between the transmission fluid 136 and the coolant fluid 146.

The position or alignment of the seal 150 between the electronic component 140 and the transmission housing 122 enables or facilitates any fluid flowing past the seal 150 to flow down through the vent space or cavity 132 and out of the one or more openings 128. If any of the first fluid 136 flows 170 past the outer loop 152, the first fluid 136 flows down through the vent space or cavity 132 to the one or more recesses 148 and then flows 174 out through the one or more openings 128 positioned at or near the bottom of the seal 150. If any of the second fluid 146 flows 172 past the one or more inner loops 154, the second fluid 146 flows through the vent space or cavity 132 to the one or more recesses 148 and flows 174 out through the one or more openings 128 at or near a lower portion of the seal 150.

Figure 9:
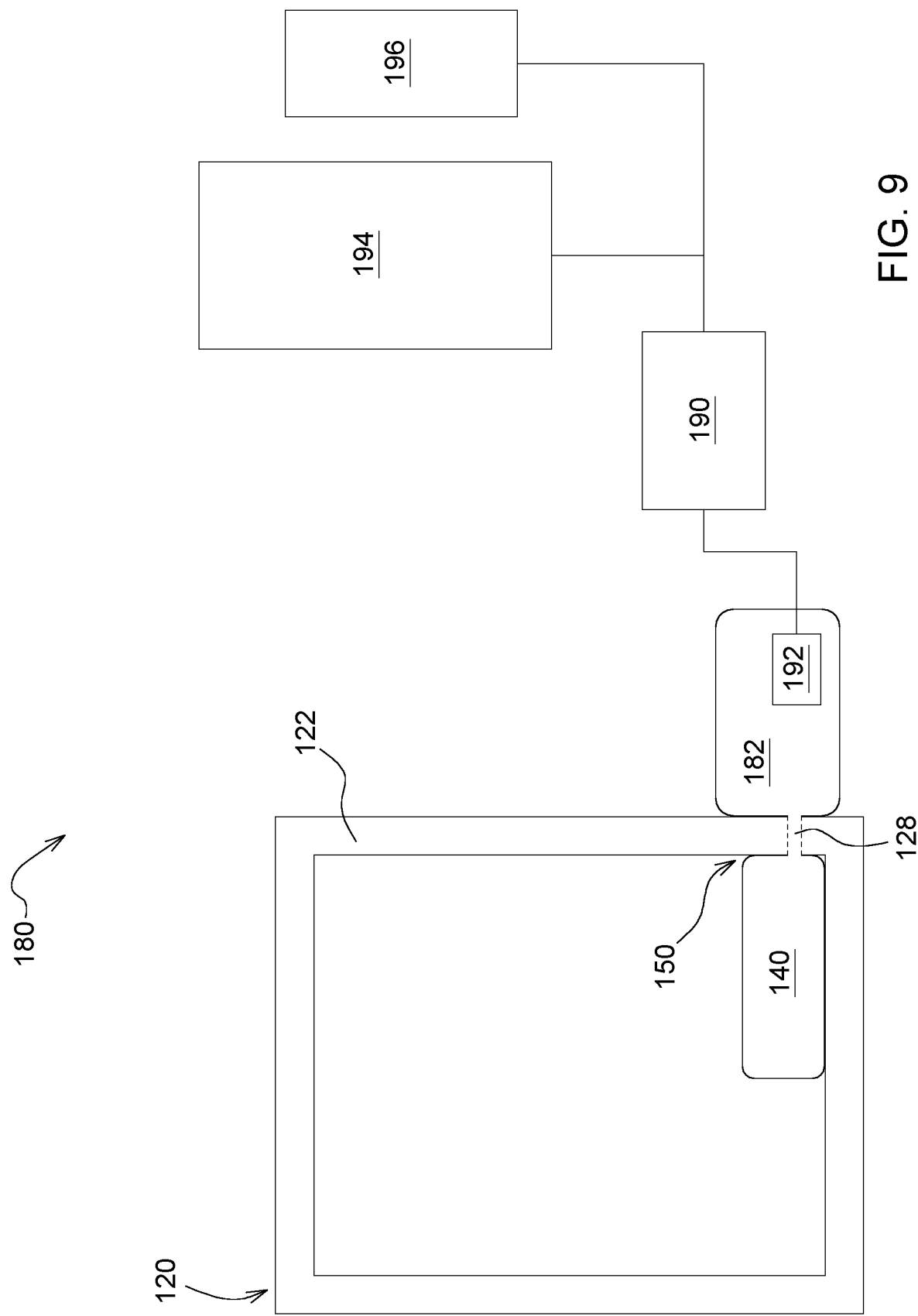
FIG. 9 is a schematic view of a sealing system for multiple fluids, according to an implementation.

With reference to FIG. 9, a sealing system 180 for multiple fluids can include an external reservoir 182 in fluid communication with the opening 128 of the transmission housing 122. Any fluid flowing past the seal 150 into the vent space 132 and out of the opening 128 can then flow into external reservoir 182. A sensor 192 can sense or detect when a fluid is flowing through the opening 128 or is present in the external reservoir 182. The sensor 192 can be any type of sensor capable of sensing or detecting whether a fluid is present. A controller 190 is in communication with the sensor 192 and determines the presence of a fluid in the external reservoir 182. The controller 190 can be in communication with a display 194, for example a display screen, monitor, tablet, or smart phone, and an indicator 196, for example a visual indicator, an audio indicator, or both. The controller 190 can determine to provide visual notification, audio notification, or both to the display 194, the indicator 196, or both if the sensor 192 senses or detects fluid.

The electronic control unit or controller 190 includes a processor and memory. The controller 190 can include digital and analog inputs and outputs. The controller 190 can include a non-transitory, computer readable memory or medium. The controller 190 connects to and communicates with various input and output devices.

The terminology used herein is for the purpose of describing example embodiments or implementations and is not intended to be limiting of the disclosure. As used herein, the singular forms "a," "an." and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A sealing system for multiple fluids, comprising:
a transmission housing forming an enclosure for one or more transmission components, the transmission housing including a first port and a first opening;
an electronic component including a first conduit, the electronic component connected to the transmission housing forming a vent space between the electronic component and the transmission housing; and
a seal positioned between the electronic component and the transmission housing, the seal including an outer loop maintaining a first fluid outside of the outer loop and a first inner loop surrounding the first conduit and positioned inside of the outer loop, the first inner loop maintaining a second fluid inside the first inner loop;
wherein the first port is in fluid communication with the first conduit, the first opening is positioned inside of the outer loop and outside of the first inner loop, and the first opening is in fluid communication with the vent space.

2. The sealing system of claim 1, wherein the seal includes a protrusion extending downward along a lower portion of the outer loop under the first conduit.

3. The sealing system of claim 1, wherein the seal includes a first link connected between the outer loop and the first inner loop maintaining a distance between the outer loop and the first inner loop.

4. The sealing system of claim 1, wherein the first opening is positioned within a recess at a lower portion of the vent space.

5. The sealing system of claim 1, wherein the transmission housing includes a first coupling surface with a first recess at a lower portion of the vent space, the electronic component includes a second coupling surface with a second recess at the lower portion of the vent space, the first recess includes in the first opening, the first recess aligns with the second recess, and the first and second recesses form a portion of the vent space.

6. The sealing system of claim 1, wherein the seal includes an additional loop for an electrical wiring connected to an electric motor-generator positioned inside the transmission housing.

7. The sealing system of claim 1, wherein:
the electronic component includes a second conduit in fluid communication with the first conduit forming an inlet and an outlet for the second fluid to regulate the temperature of the electronic component;
the seal includes a second inner loop surrounding the second conduit and positioned inside of the outer loop;
the second inner loop maintains the second fluid inside the second inner loop;
the transmission housing includes a second port and a second opening;
the second port is in fluid communication with the second conduit;
the second opening is positioned inside of the outer loop and outside of the first inner loop; and
the second opening is in fluid communication with the vent space.

8. The sealing system of claim 1, wherein the electronic component is positioned at least partially in a fluid sump of the transmission.

9. The sealing system of claim 1, wherein the electronic component is a power electronics device.

10. The sealing system of claim 1, further comprising:
a sensor to detect a fluid flowing through or out of the first opening; and
a controller to determine providing a visual or audio notification when the fluid is detected flowing through or out of the first opening.

11. A transmission, comprising:
a transmission housing forming an enclosure for one or more transmission components, the transmission housing including a first port and a first opening;
an electronic component including a first conduit, the electronic component connected to the transmission housing forming a vent space between the electronic component and the transmission housing; and
a seal positioned between the electronic component and the transmission housing, the seal including an outer loop maintaining a first fluid outside of the outer loop and a first inner loop surrounding the first conduit and positioned inside of the outer loop, the first inner loop maintaining a second fluid inside the first inner loop;
wherein the first port is in fluid communication with the first conduit, the first opening is positioned inside of the outer loop and outside of the first inner loop, and the first opening is in fluid communication with the vent space.

12. The transmission of claim 11, wherein the seal includes a protrusion extending downward along a lower portion of the outer loop under the first conduit.

13. The transmission of claim 11, wherein the seal includes a first link connected between the outer loop and the first inner loop maintaining a distance between the outer loop and the first inner loop.

14. The transmission of claim 11, wherein the first opening is positioned within a recess at a lower portion of the vent space.

15. The transmission of claim 11, wherein the transmission housing includes a first coupling surface with a first recess at a lower portion of the vent space, the electronic component includes a second coupling surface with a second recess at the lower portion of the vent space, the first recess includes in the first opening, the first recess aligns with the second recess, and the first and second recesses form a portion of the vent space.

16. The transmission of claim 11, wherein the seal includes an additional loop for an electrical wiring connected to an electric motor-generator positioned inside the transmission housing.

17. The transmission of claim 11, wherein:
the electronic component includes a second conduit in fluid communication with the first conduit forming an inlet and an outlet for the second fluid to regulate the temperature of the electronic component;
the seal includes a second inner loop surrounding the second conduit and positioned inside of the outer loop;
the second inner loop maintains the second fluid inside the second inner loop;
the transmission housing includes a second port and a second opening;
the second port is in fluid communication with the second conduit;
the second opening is positioned inside of the outer loop and outside of the first inner loop; and
the second opening is in fluid communication with the vent space.

18. The transmission of claim 11, wherein the electronic component is positioned at least partially in a fluid sump of the transmission.

19. The transmission of claim 11, wherein the electronic component is a power electronics device.

20. The transmission of claim 11, further comprising:
a sensor to detect a fluid flowing through or out of the first opening; and
a controller to determine providing a visual or audio notification when the fluid is detected flowing through or out of the first opening.

* * * * *